US008718394B2

(12) United States Patent
Vandame

(10) Patent No.: US 8,718,394 B2
(45) Date of Patent: May 6, 2014

(54) METHOD AND DEVICE FOR ENHANCING A DIGITAL IMAGE

(75) Inventor: Benoit Vandame, Betton (FR)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/160,263

(22) Filed: Jun. 14, 2011

(65) Prior Publication Data
US 2011/0311154 A1  Dec. 22, 2011

(30) Foreign Application Priority Data

Jun. 17, 2010 (GB) .................................. 1010177.2

(51) Int. Cl.
*G06K 9/40* (2006.01)
(52) U.S. Cl.
USPC ........................................................ 382/263
(58) Field of Classification Search
USPC ................... 345/694, 695; 348/354, E7.005; 382/201, 210, 254, 260, 261, 263; 702/17
See application file for complete search history.

(56) References Cited

U.S. PATENT DOCUMENTS 7,809,726 B2 * 10/2010 Flanagan ....................... 707/737
7,817,837 B2 * 10/2010 Omi et al. ...................... 382/131
2003/0007699 A1 * 1/2003 Trifonov et al. ............... 382/275
2007/0177791 A1 * 8/2007 Shi et al. ....................... 382/155
2011/0091192 A1 * 4/2011 Iwane ............................ 396/113

FOREIGN PATENT DOCUMENTS

WO   WO2005122086 A2   12/2005

* cited by examiner

*Primary Examiner* — Gregory F Cunningham
(74) *Attorney, Agent, or Firm* — Canon USA Inc. IP Division

(57) ABSTRACT

The present invention relates to a method and a device for enhancing a digital image comprising samples or pixels.
The method comprises:
  defining a patch of samples surrounding any given sample;
  computing distance values representing similarity between patches of a first sample and other samples to obtain a distance map;
  computing, using the distance map, weights to obtain a weight map;
  applying a filter enhancing high spatial frequencies to the weight map to obtain an enhanced weight map;
  filtering the first sample by averaging the samples using the enhanced weight map, to obtain an enhanced first sample.
The invention provides a very efficient enhancement of the digital image since coherent structures that would usually not influence the enhancement of the image, are detected and made more significant thanks to the filtering of the weight map.

14 Claims, 2 Drawing Sheets

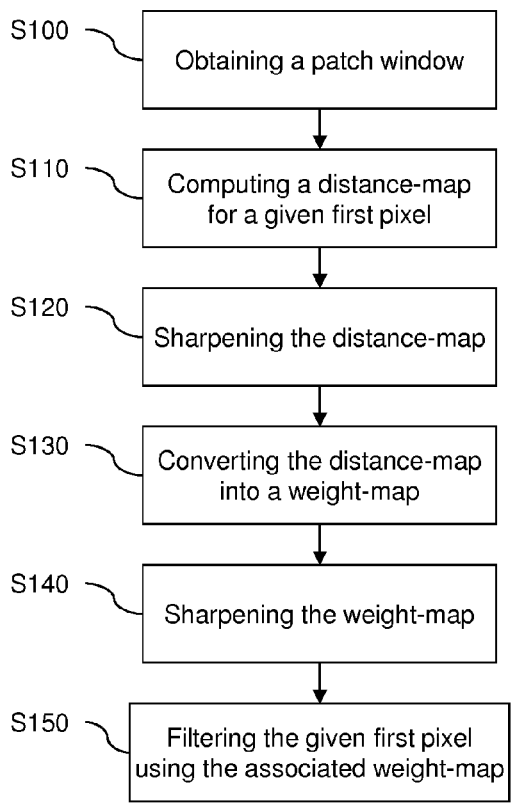
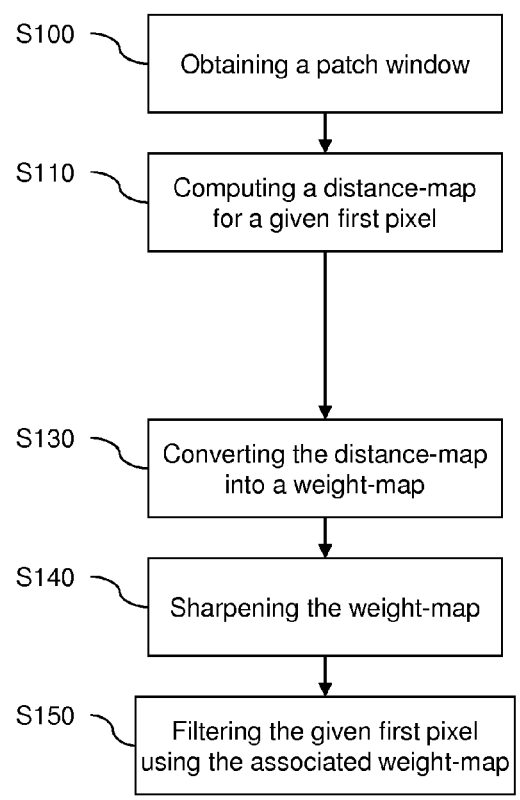
Fig. 1
Fig. 2

METHOD AND DEVICE FOR ENHANCING A DIGITAL IMAGE

FIELD OF THE INVENTION

The present invention relates to a method and a device for enhancing a digital image.

BACKGROUND OF THE INVENTION

Enhancement of a digital image generally concerns "contrast restoration or amplification" or "image sharpening" within the image.

With sharpening, faint and/or fine details of the image, such as textures (repetition of an elementary pattern), edges and corners of an object are enhanced and made more visible, which would otherwise never have been seen in the original image, making the image appear more crisp and clear.

There exist conventional solutions that sharpen faint/fine details in digital images. They generally operate in the spatial frequency domain where the details are represented by middle (rough details) to high (fine details) frequencies.

More particularly, a controlled amplification of these middle to high frequencies is generally performed, to obtain a controlled improvement of the contrast of the corresponding details. For instance, subtracting the Laplacian function of an image from that image makes the image sharper by enhancing middle to high spatial frequencies (high frequency details).

An operator can access this function through menus provided in image processing software (see Photoshop—commercial brand—which offers for example a de-blurring function). Sometimes, similar functions are embedded in end devices, such as printers or displays.

The main drawback of these conventional solutions lies in the noise increase in these middle to high frequencies.

As explained in the publication WO2005/122086, noise in the image may result from the non-uniform sensitivity of the acquisition device (such as CCD arrays) or medium (such as a photosensitive medium).

The above conventional solutions amplify the acquired noise together with the targeted faint details.

Due to this drawback, the basic image sharpening algorithms are, most often, dedicated to low contrast amplification to prevent any strong amplification of the noise.

As mentioned in the same publication, more sophisticated algorithms combine a de-noising process with a sharpening process.

Such a de-noising process generally assumes that the geometrically closest pixels to a given pixel are the most similar pixels to the given pixel. Based on this assumption, the de-noising process filters a given pixel of the image by averaging the pixels surrounding it.

This is what is called a "local" filtering.

Usually, the latter implements a convolution on each pixel, said convolution being based on a "local" filtering kernel defining a relation between the given pixel and the surrounding closest pixels.

However, removing the noise from textures appears to be a tough task, and most of the time, the de-noising processes also remove small details in the image. Improvement of the image quality is therefore doubtful.

The publication WO2005/122086 and the publication "*Image enhancement by non-local reverse heat equation*", A. Buades, B. Coll, J-M. Morel, Preprint CMLA 2006-22 (2006) provides a Non-Local Means (NLM) de-noising algorithm that seeks to overcome the above drawbacks.

The NLM de-noising algorithm uses a filtering kernel per pixel that averages a given pixel with a collection of pixels similar to it. Contrasting with the above "local" filtering kernel, the collection of pixels in an NLM algorithm is distributed within the image without any condition on geometrical distance to the given pixel. This is why the filtering kernel is referred to as "non-local".

The NLM de-noising algorithm enables efficient de-noising with very good preservation of faint details like textures since the similarity between pixels is taken into account. A better and more efficient enhancement of the original image is therefore obtained.

In more detail, it is known that a digital image is made of an array of samples, for example pixels or voxels, each having one or more component values to represent colours (grayscale value or Red-Green-Blue colour values for example). The NLM de-noising algorithm is applied to each colour component, i.e. once for a grayscale image and three times for an RGB image.

The NLM method comprises the following steps:
obtaining a spatial window, generally a square window but possibly of any other shape that is centred on the particular sample, defining, for a given sample, a patch made of the given sample and samples surrounding the given sample;
computing a plurality of distance values between a first sample and a plurality of other samples to obtain a map of distances, a distance value between two samples representing the similarity between their corresponding patches;
computing, using the map of distances, a plurality of weights corresponding to the plurality of other samples, so as to obtain a map of weights; and
filtering the first sample of the digital image by averaging said samples of the digital image using the map of weights, to obtain an enhanced first sample.

The NLM algorithm relies on a metric to quantify and compute distances between a given sample (generally a pixel) and each of all or part of all other samples in the image. The metric enables the distance between two samples or pixels to be computed.

For the remainder of the description, reference will be made to pixels. However the invention may be applied to samples other than pixels that form a digital image. A reference to samples may be used herebelow to refer to the general definition of the invention.

As far as the NLM algorithm is concerned, the distance is computed from two pixel values and their respective neighbouring or surrounding pixel values, to quantify a similarity between those two given pixels: two pixels are even more similar when they have the same (colour component) value and, in each of their respective neighbouring pixel pairs (i.e. having the same relative position to the given pixels), the two pixels of the pair also have the same value.

If we name "patch" the set of a pixel and its defined neighbourhood/surrounding of pixels, the distance between two pixels is zero if their respective patches are equal and is large if their respective patches differ greatly.

As an example, a Gaussian weighted Sum of Square Difference (SSD) may be used to compute the "similarity" distance between two pixels.

In the NLM algorithm, a plurality of distances from other pixels of the image is computed for a given first pixel. Generally a distance from each other pixel of the image is computed.

A map of distances or "distance map" comprising all these distances from each other pixel is then built for said given first pixel.

In order to avoid heavy computation, it may be decided to compute such a distance map within a search window centred on the given first pixel.

The distance map then has the same size as the digital image or the search window, as appropriate.

The value in the middle of the distance map of a given first pixel equals 'zero' since this "middle" location corresponds to the location of the given first pixel in the image and its value represents the distance between this first pixel and itself.

The other values of the distance map indicate how close, in terms of similarity, the given first pixel and its respective patch are to other pixels and their respective patches.

By using such a distance map, the NLM algorithm seeks to average similar pixels regardless of their geometrical distance from the first pixel, i.e. to average pixels very close in terms of the "similarity" distance as referred to above.

The distance map is then converted into a map of weights, also referred to as "weight map" below, wherein the weighting values are large for similar pixels, and small or zero for dissimilar pixels.

In the above publications, an exponential function is used to convert the distance map. The weight map obtained is made of zeros or positive values.

The given first pixel is subsequently filtered to become a de-noised pixel by using its associated weight map, which operates as a "non-local" filtering kernel. The weight map may be used in a convolution filtering operation, similar to that for the above-mentioned "local" convolution kernel.

This filtering of the first pixel by using the "non-local" filtering kernel computes an average of the pixels that are similar to the given first pixel.

Once all the pixels of the original image have been filtered to become averaged pixels, i.e. de-noised pixels or "enhanced pixels", an enhanced image made of these enhanced pixels is obtained.

As it may be noted, the NLM algorithm only performs de-noising processing, and then yields a de-noised image as an enhanced image.

In "*Image enhancement by non-local reverse heat equation*", an additional enhancing operation is conducted to sharpen the image and make the faint details even more visible.

In this enhancing process, the following operations are performed:
1. computing all the weight maps corresponding to all the pixels of the image to be processed, by implementing the above NLM algorithm;
2. filtering the image by subtracting the Laplacian operator (or "Laplacian") of the image (made of the Laplacian operator for each pixel of the image) from the image in order to sharpen it, even if the noise spread all over the image is amplified;
3. filtering the sharpened image using the weight maps obtained in step 1. This filtering is similar to the filtering in the NLM algorithm, but is applied to the image modified at step 2; and
4. going back to step 2 as long as one or several enhancement criteria have not been reached.

This process combines multiple iterations of sharpening operations (repetition of step 2 through the loop back from step 4) and of de-noising operations (repetition of step 3 through the same loop back). It results in an improved efficiency of image enhancement of faint details like textures compared to the other known solutions, while keeping a reasonably low level of noise.

However, this solution appears not to be satisfactory enough, in particular because of the noise amplification during the above step 2. Indeed, step 2 still involves striking a balance between improvement of the sharpness and amplification of noise: either the obtained sharpness is low, or the amplified noise is high, requiring a very efficient post de-noising process to be implemented.

Furthermore, the repetition of steps 2 and 3 through the loop back involves a complex processing scheme and considerably increases the processing time.

The present invention aims to solve the above drawbacks.

SUMMARY OF THE INVENTION

The present invention provides more efficient sharpening of an image while still keeping a low level of noise within the image. This is achieved by filtering the map of weights to sharpen it, and then by using this sharpened map to filter the corresponding first sample.

More particularly, the filtering of the map of weights enables recovery of additional faint or minor coherent structures (such as textures) hidden in insignificant weights (i.e. that would not have influenced the enhancement of the original image in the case of the NLM algorithm since those (small value) weights are not significant).

Thanks to this additional filtering according to the invention, the final filtering of the first sample becomes a de-noising plus enhancing (sharpening) filtering. A non local de-noising plus enhancing filtering kernel is then used.

In other words, the de-noising and the sharpening are performed at the same time on each pixel of the original image. Only one filtering step of the original image is required, contrary to the above cited "*Image enhancement by non-local reverse heat equation*".

A better general or global sharpening of the original image is therefore obtained, ensuring sharper textures in the image still with a low level of noise afforded by the basic steps of the NLM algorithm.

It further avoids disadvantageous noise amplification that requires subsequent very efficient de-noising algorithms.

It may also observed that the present invention avoids looping back to earlier processing steps. The enhancing method of the invention also requires very little additional computation relative to the standard NLM algorithm. Therefore the processing time is drastically reduced compared to the prior art.

The present invention also relates to an information storage means and to a computer program product.

The device, the computer program and the information storage means have features and advantages that are analogous to those set out above in relation to the method of enhancing a digital image.

The method may further comprise a step of applying a filter enhancing high spatial frequencies to the map of distances to obtain an enhanced map of distances that is then used for the computation of the map of weights. In this case the method comprises both filtering the map of distances and the map of weights compared to the NLM process.

The filtering of the map of the distances also enables recovery of additional coherent structures hidden in insignificant distance values. In combination with the filtering of the map of weights, this further improves the enhancement of the NLM algorithm, with very little additional computation.

According to a feature of the invention, the filter enhancing high spatial frequencies is a sharpening filter adapted to increase the contrast in a map. This is particularly suitable for the enhancement according to the invention since the contrast sharpening obtained for the map of distances or weights by using such a filter enables relevant sharpening of high frequency structures.

In particular, the sharpening filtering using the sharpening filter comprises the calculation of the Laplacian operator of said map. This ensures low complexity when implementing the sharpening filtering.

According to a particular feature, the sharpening filtering using the sharpening filter depends on the statistical distribution of the distance or weight values within said map. This means that the filtering may be adapted to the specific content of the image. It results in improved filtering of the map of distances or weights, and therefore in a further improved enhancement of the digital image when filtering using the resulting map of weights.

Particularly, the sharpening filter filters said map according to the function $M - c \cdot \Delta M$, where M is the map, $\Delta$ is the Laplacian operator and c is a sharpening intensity parameter which depends on said statistical distribution. This embodiment combines implementation with low complexity and further improved enhancement of the digital image.

In one embodiment of the invention, the computation of the weights implements a function that is defined in both negative and positive distance values and takes values in a predefined range of weight values. This is due to the fact that the previous filtering of the map of distances may generate negative values. This embodiment therefore ensures consideration of such negative distances which may be obtained when sharpening the map of distances.

In particular, in the weight computing step, higher weights may be computed for negative distance values than for positive distance values. This ensures that the most significant structures in the map of distances remain most significant in the map of weights. In this respect, the enhancement obtained by filtering the map of distances is kept.

According to a feature of the invention, the method further comprises a step of defining a spatial search window centred on the first sample in the digital image, and the plurality of distances for said first sample is computed for each other sample in the spatial window. A reduction of processing or calculation time is therefore obtained, and less memory (processing means) is required to store (process) the distances and weights, which is particularly suitable for low resource devices.

BRIEF DESCRIPTION OF THE DRAWINGS

Other possible features and advantages of the invention will also appear in light of the following description given by way of example only, and illustrated by the appended drawings, wherein:

FIGS. 1 and 2 represent, in flowcharts, the general steps of an method of enhancing a digital image according to two respective embodiments of the invention;

DETAILED DESCRIPTION OF EMBODIMENTS OF THE INVENTION

Figure 3:
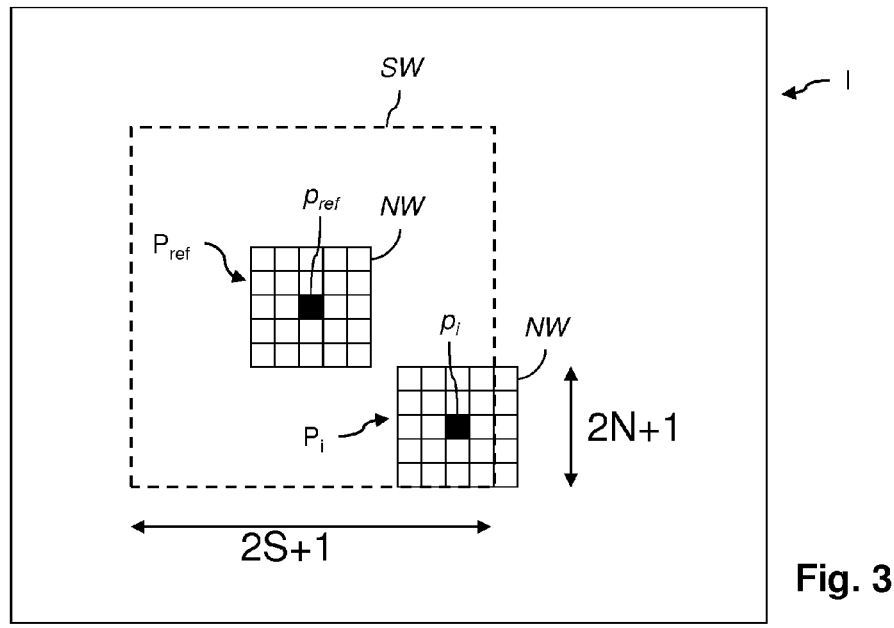
FIG. 3 schematically shows an image with pixels, patches of neighbours and a search window according to the invention.

FIGS. 1 and 2 illustrate two embodiments of the present invention, in which the same references refer to the same steps. These Figures show the steps for filtering a given current pixel according to the invention, in order to provide de-noising and sharpening of an original image I.

As may be observed in these Figures, the two embodiments differ in that the step of sharpening the map of distances (or "distance map") computed during the standard NLM algorithm is performed or not, while the map of weights (or "weight map") is each time sharpened before it is used to filter a sample of the digital image.

In FIG. 1, a filter enhancing high spatial frequencies is applied both to the map of distances to obtain an enhanced map (S120) of distances and to the map of weights to obtain an enhanced map of weights (S140).

Any conventional sharpening filters, such as Laplacian filters, may be applied to either or both of the maps.

In FIG. 2, only the map of weights is filtered to enhance spatial middle to high frequencies, i.e. to sharpen the weight map (S140).

In both embodiments, the maps become sharper thanks to these filtering operations.

The sharpening of the distance map makes it possible to enhance minor coherent structures represented by large distance values in the map. This is because coherent faint variations with high distance values are transformed into large variations allowing local minima of those variations to be closer to zero. Since the distance of the filtered local minima is being closer to zero in the distance-map, it will be associated with a significant weight in the weight-map. Therefore, the weight-map reflects very faint structures which will be sharpened when using the weight map for filtering a sample of the digital image.

Similarly, the filtering of the weight map makes it possible to enhance other minor coherent structures that are represented by small weight values in the map. The filtering enhances these relevant small weight values, such that they are more significant in the final weight map used for the sharpening of the original image.

Applying the resulting weight map as a convolution kernel to the given first pixel makes it possible to compute a new pixel which is sharpened and de-noised compared to the original pixel.

This process, as described below in relation to steps S100 to S150, is successively applied to each pixel of the original image I in order to obtain a new image that is sharpened and de-noised for all the pixels. The current pixel processed (sharpened) is a reference pixel for these steps and is named "current first pixel $p_{ref}$".

Still with reference to FIGS. 1 and 2, these two embodiments are now further detailed, for a current first pixel or sample $p_{ref}$ of an original image I to be processed.

In step S100, a spatial window NW (for Neighbourhood Window) defining, for a given sample $p_i$ a patch $P_i$ made of the given sample and samples surrounding the given sample $p_i$ is obtained.

The spatial window NW is preferably defined once for the whole image I, which means that the same window size is obtained at each step S100 for processing each pixel $p_i$ of the image.

As an example, this window NW has a square shape aligned on the pixel array of the image I, as shown in FIG. 3. Each side of the window NW is equal to 2N+1, where N is a non-zero positive integer, centred on a pixel $p_i$ having the coordinates (x, y).

In the example of the Figure, the neighbourhood window NW has a size of 5 pixels by 5 pixels, corresponding to N=2. Two patches $P_{ref}$ and $P_i$ are defined by this window NW, respectively centred on the pixels $p_{ref}$ and $p_i$.

N may also be greater than 2, for example 3 to 5.

Any other shape of the patch or neighbourhood window NW may however be used, such as a rectangle, a circle, etc.

In step S110, a map of distances or distance map $D^{ref}$ is built for the current first pixel to be processed. This step comprises computing a plurality of distance values $d_i^{ref}$ between the current first sample $p_{ref}$ and a plurality of other samples $p_i$ to obtain a map of distances.

In the invention, a given distance value between two samples represents the similarity between their corresponding patches or "neighbourhood" of samples. The computed distance is therefore a "similarity" distance.

It may be noted that, although this "similarity" distance quantifies a distance between two pixels $p_{ref}$ and $p_i$, its computation involves the pixels surrounding these two pixels, in particular the associated patch $P_{ref}$ and $P_i$.

As shown in FIG. 3, a spatial search window SW (for Search Window) centred on the first sample may optionally be defined in the digital image, and the plurality of distances for said first sample is computed for each other sample in the spatial search window.

The search window SW then limits the collection of other samples $p_i$ involved in the calculation of the distance map $D^{ref}$. This enables processing time to be reduced, particularly for use in an enhancing device implementing the present invention with few resources.

The search window SW may also be of square shape, of size 2S+1 (S being a non-zero positive integer greater than N, for example three to five times N, for example S=10), centred on the current first pixel $p_{ref}$.

In a particular case, the search window SW may be the whole image I, in which case all other pixels $p_i$ of the image I are involved in the calculation of the distance map $D^{ref}$ for the current first pixel $p_{ref}$.

During step S110, a "similarity" distance $d_i^{ref}$ is therefore computed between the current first pixel $p_{ref}$ and each of the other pixels $p_i$ of the search window SW: $d_i^{ref}$=distance($p_{ref}$, $p_i$), where $p_i \in$ SW.

The computation of such a distance is now detailed.

The neighbourhood window NW obtained at step S100 is applied both to the current first pixel $p_{ref}$ to define an associated patch of pixels $P_{ref}$ and to the other pixel $p_i$ involved in the calculation to define an associated patch $P_i$ as shown in FIG. 3.

A Euclidian distance may be applied to the values composing these two patches $P_{ref}$ and $P_i$ to compute the distance $d_i^{ref}$ between $p_{ref}$ and $p_i$.

It is to be recalled that in case a pixel has several colour components, the steps of the invention may be applied separately to each of these components.

For example the distance $d_i^{ref}$ may be defined as a Gaussian-weighted Euclidian norm of the two patches $P_{ref}$ and $P_{ref}$ surrounding $p_{ref}$ and $p_i$:

$$d_i^{ref} = \|P_{ref} - P_i\| = \frac{1}{C}\sum_{k=0}^{k=2N}\sum_{l=0}^{l=2N}\sqrt{G_a\left(\sqrt{(l-N)^2 + (k-N)^2}\right)|P_{ref}(k,l) - P_i(k,l)|^2}$$

where
the parameter C is $$\sum_{k=0}^{k=2N}\sum_{l=0}^{l=2N}\sqrt{G_a\left(\sqrt{(l-N)^2 + (k-N)^2}\right)},$$

ensuring conservation of the total energy in the distance map,
$P_{ref}(k,l)$ is the pixel with coordinates (k,l) within the patch $P_{ref}$ associated with the pixel $p_{ref}$, the indexes k and l varying within the interval [0, 2N] (idem for $P_{ref}$ with respect to pixel $p_i$),
the function $G_a$ is a centred Gaussian function of variance a.

The Gaussian function $G_a$ is a weighting function which increases patch differences at the centre of the patch P compared to its borders or corners. The variance a of $G_a$ is set to a=N/3 to have a large decay of $G_a$ at the borders of the patch.

Another example of the distance $d_i^{ref}$ is the sum of absolute difference (SAD) without Gaussian weighting:

$$d_i^{ref} = \|P_{ref} - P_i\| = \frac{1}{(2N+1)^2}\sum_{k=0}^{k=2N}\sum_{l=0}^{l=2N}|P_{ref}(k,l) - P_i(k,l)|$$

In this case, the pixel values of the patch differences contribute with equal weight to the patch distance whatever their locations within the patch. This SAD function allows faster computation for most CPU's, particularly when they provide a special hardware instruction capable of performing SAD on several values per instruction.

Whatever the distance function chosen, the distance between two pixels is close to zero if the two pixels are similar, i.e. if their associated patches are similar, and the distance takes a high value if the two pixels are very dissimilar.

Step S120 (FIG. 1) is a sharpening step of the distance map $D^{ref}$. This step aims to sharpen the distance map before it is converted into a weight map as provided by the NLM algorithm (see step S130 below). This filtering allows faint and minor structures such as textures to be strengthened in the weight map and then in the de-noising filtering kernel, which will help the general sharpening of faint details in the image, whereas in the standard NLM algorithm, these structures would not have been detected.

As defined above, this is a step of applying a filter enhancing high spatial frequencies to the map of distances to obtain an enhanced map of distances that is then used for the computation of the map of weights.

In more detail, the distance map obtained at step S110 is made of zero and positive distance values:

the central value of the distance map corresponds to the distance between the current first pixel $p_{ref}$ and itself. It is therefore equal to zero since the distance $d_i^{ref} = \|P_{ref} - P_{ref}\| = 0$;

other values can be zero if their associated patches $P_i$ are equal to the patch $P_{ref}$ of the current first pixel;

small positive values are associated with pixels $p_i$ which are similar to pixel $P_{ref}$ (by considering the associated patches). As shown below, these small distance values $d_i^{ref}$ of the pixels $p_i$ will be converted into large weights $w_i^{ref}$ of the weight map and will contribute prominently to the de-noising of the current pixel $p_{ref}$;

the large positive distance values can be very high. In the standard NLM algorithm, when the distance map is then converted into a weight map, all the large values are converted into very small weights (almost equal to zero) and have therefore no impact or very limited impact on the enhancement of the original image. These large values $d_i^{ref}$ and their corresponding pixels $p_i$ are therefore not significant for the enhancement.

However, the large values may show faint coherent structures with large variations especially in the case of textures.

Contrary to the known methods of the prior art, the invention seeks to use these coherent structures shown or represented by the large distance values to improve general sharpening of the image.

This is done by the sharpening step S120 where a sharpening filter is applied to the distance map obtained at step S110.

This sharpening step enhances the large distance values representing coherent faint structures to make these structures more significant, by transforming the values into values having large variations but local minima which are closer to zero. These minima being small values in the distance map, they will become prominent in the weight map as explained below.

In an example of implementation, the distance map $D^{ref}$ is processed as a two-dimensional image which is filtered using standard sharpening filters adapted to amplify or increase the contrast in the map of values.

For instance, the filtered or enhanced distance map $D_{sharp}^{ref}$ is computed as follows: $D_{sharp}^{ref} = D^{ref} - c_{D^{ref}} \cdot \Delta D^{ref}$ where Δ stands for the Laplacian operator; and $c_{D^{ref}}$ is a scale or sharpening intensity parameter which controls the sharpening intensity applied to $D^{ref}$.

$\Delta D^{ref}$ is typically computed by convolving $D^{ref}$ with the Laplacian convolution kernel:

$$\begin{bmatrix} -1 & -1 & -1 \\ -1 & 8 & -1 \\ -1 & -1 & -1 \end{bmatrix}.$$

$\Delta D^{ref}$ has the size of $D^{ref}$ (either the size of the image I or the size 2S+1 of the search window SW) and, once computed, the image $\Delta D^{ref}$ is multiplied by the scale or sharpening intensity factor $c_{D^{ref}}$, and the result is subtracted from $D^{ref}$. This subtracting of the Laplacian operator enables enhancement of middle to high spatial frequencies in the map.

The sharpening intensity parameter $c_{D^{ref}}$ may take values from 0 (no sharpening) to high values such as 1, 2 or 3 (very strong sharpening). For example, the parameter $c_{D^{ref}}$ is set to 1 for strong sharpening, or to 0.2 for moderate sharpening.

Preferably, this parameter is the same for processing all the pixels of the image I as first pixels $p_{ref}$, but may be adjusted depending on parts of the image.

According to the above formula, the distances within the enhanced distance map $D_{sharp}^{ref}$ may take negative values, sharply contrasting with the standard NLM algorithm where the distance map only has zero or positive values as shown above.

In a particular embodiment of the invention in which step S120 is conducted, the sharpening intensity parameter $c_{D^{ref}}$ may vary.

In particular, this variation may be dependent on the statistical distribution of the sample values within the distance map $D^{ref}$ (this corresponds to the general shape of the content represented by the map), making the sharpening of the enhanced distance map $D_{sharp}^{ref}$ a function of the statistical distribution within $D^{ref}$.

This is because the distance map $D^{ref}$ shows how the values of the pixels are distributed in the neighbourhood of the current first pixel $p_{ref}$. The nature of the image may be therefore easily determined by analyzing the statistical distribution of distances within the distance map $D^{ref}$.

For instance: if the current pixel $p_{ref}$ lies in a practically uniform area, the corresponding region of the map $D^{ref}$ is practically uniform with close-to-zero values; if the current pixel $p_{ref}$ lies on an edge, the corresponding map $D^{ref}$ shows a bright line with the same orientation as the edge; if the current pixel $p_{ref}$ lies in a sharp redundant texture, the corresponding map $D^{ref}$ shows bright Dirac functions spread with the same redundancy as the texture.

This particular embodiment therefore makes it possible to choose an independent sharpening intensity $c_{D^{ref}}$ to compute each enhanced distance map $D_{sharp}^{ref}$ depending on the nature of the image at the location of the current pixel $p_{ref}$.

This embodiment of FIG. 1 takes advantage of this information to improve, in the distance map, the sharpening of coherent structures represented by large distance values, which structures would not be detected by the NLM algorithm. Therefore, the general sharpening of the original image I is improved.

The more complex the structures or textures of the distance map $D^{ref}$, the higher the sharpening intensity parameter $c_{D^{ref}}$ would be.

As an illustration:

if $D^{ref}$ is constant or nearly uniform with close-to-zero values, the image is almost a (nearly) uniform and faint sharpening is sufficient. $c_{D^{ref}}$ is therefore set to 0.05;

if $D^{ref}$ shows redundancies, the image around the location of the current first pixel shows a texture and a strong sharpening is appropriate. $c_{D^{ref}}$ is therefore set to 1;

if $D^{ref}$ shows a bright line, the image around the location of the current first pixel shows a sharp edge and moderate sharpening is appropriate. $c_{D^{ref}}$ is therefore set to 0.2.

Still with reference to FIGS. 1 and 2, step S130 is a conversion step of the distance map $D^{ref}$ or the enhanced distance map $D_{sharp}^{ref}$, as appropriate, into a weight map $W^{ref}$, by computing, using the map of distances (possibly enhanced), a plurality of weights corresponding to the plurality of other samples, so as to obtain a map of weights.

The weight map $W^{ref}$ has the same size as the (enhanced) distance map used in this step S130, i.e. the size of the image I or the size 2S+1 of the search window SW when it is used.

As stated above in relation to the prior art, exponential functions may be used to perform the conversion.

In the case of FIG. 2 which has no step S120, conventional conversion functions may be implemented and are not further detailed here below.

In the case of FIG. 1 in which step S120 is conducted, there is a need to adapt these conversion functions or to use new functions to process the result of this step S120, in particular since the enhanced distance map has negative values. In this respect, a conversion function is preferably implemented which is defined in both negative and positive distance values. Furthermore, this function may take values in a predefined range of weight values to ensure control of the weighting.

Two examples are given below of conversion functions that may be used in a step S130 following step S120.

In a first example, for any position $(k, l) \in [0, 2S]^2$ corresponding to the other pixel $p_i$ and to the distance value $d_i^{ref} = d_{k,l}^{ref} = D_{sharp}^{ref}(k,l)$ in the enhanced distance map, the corresponding weight $w_i^{ref}$ or $w_{k,l}^{ref}$ of the weight map $W^{ref}$ is computed as follows:

$$w_i^{ref} = w_{k,l}^{ref} = W^{ref}(k, l) = \begin{cases} \exp\left(\dfrac{-D_{sharp}^{ref}(k, l)}{h^2}\right) & \text{if } D_{sharp}^{ref}(k.l) > 0 \\ 2 - \exp\left(\dfrac{D_{sharp}^{ref}(k, l)}{h^2}\right) & \text{else} \end{cases}$$

where h is a parameter to control the degree of de-noising, and exp( ) is the exponential function.

The de-noising intensity parameter h is typically equal to the noise amplitude of the original image I.

By default, this parameter h may be set to 1 or 2 if the original image I shows little noise (this may be observed visually by an operator for example), or set to high value such as 10 for a noisy original image.

Since the first term $$\exp\left(\frac{-D_{sharp}^{ref}(k, l)}{h^2}\right)$$

would become very large for the negative values of $D_{sharp}^{ref}$, there is a high risk that few very large values would dominate the weight map and would then cause some usually significant coherent structures to be under-used in the general sharpening of the image I.

The second term $$2 - \exp\left(\frac{D_{sharp}^{ref}(k, l)}{h^2}\right)$$

aims to solve this problem by processing the negative values while the first term is used for the positive values.

This second term has been designed to take values in a predefined interval, in the example [1, 2], while the first term takes values in a lower interval, in the example [0, 1].

As may be observed from the resulting formula, the weights $w_{k,l}^{ref}$ take values in the interval [0, 2], and the negative distance values of the enhanced distance map are converted into higher weights than the positive distance values.

In a second example, a single formula may be used to avoid any test on the sign of the distance values and thus to allow faster computation.

For example, the following sigmoid style function may be used as a conversion function:

$$w_{k,l}^{ref} = W^{ref}(k, l) = \frac{2}{1 + \exp\left(\dfrac{D_{sharp}^{ref}(k, l)}{h^2}\right)}$$

This formula produces comparable weight maps to the first example above, still with higher weights for the negative distance values compared to the weights for the positive distance values. In addition, the weights still remain in the value interval [0, 2].

It may be noted that the sharpening step S120 of the distance map $D^{ref}$ has made it possible to enhance faint structures having large values in the distance map to make them still visible despite the exponential term of the two conversion formulas above which tend to flatten (weight almost equal to zero) all values of the distance map which are greater than 2 or 3 times $h^2$.

The weight map $W^{ref}$ obtained at the end of step S130 is made of positive values that are, in the standard NLM algorithm, directly used to filter the current first pixel $p_{ref}$ depending on its neighbourhood (see step S150 below). The weights of the weight map perform a diffusion of similar other pixels of the search window (those having large weights) into said current first pixel to obtain an enhanced first pixel.

In the embodiments of FIGS. 1 and 2, a step S140 of sharpening the weight map $W^{ref}$ follows step S130.

This step S140 aims to sharpen the weight map $W^{ref}$ before it is used in the filtering of the current first pixel $p_{ref}$. This step S140 makes it possible to sharpen the faint and minor structures such as textures that are present in the weight map and then makes it possible to obtain a sharpened de-noising filtering kernel.

Using such de-noising plus a sharpening filtering kernel gives better general or global sharpening of faint details in the original image I.

As defined above, step S140 is a step of applying a filter enhancing high spatial frequencies to the map of weights to obtain an enhanced map of weights that is then used for the filtering of said first sample.

In more detail, step S140 may be similar to step S120, but applied to the weight map $W^{ref}$ instead of the distance map $D^{ref}$.

As an illustration, the weight map $W^{ref}$ is processed as a two-dimensional image which is filtered using standard sharpening filters adapted to amplify or increase the contrast in the map of values.

The filtered or enhanced weight map $W_{sharp}^{ref}$ is computed as follows:

$$W_{sharp}^{ref} = W^{ref} - c_{D^{ref}} \cdot \Delta W^{ref}.$$

$\Delta$ stands for the Laplacian function.

$\Delta W^{ref}$ is computed by convolving $W^{ref}$ with the Laplacian convolution kernel:

$$\begin{bmatrix} -1 & -1 & -1 \\ -1 & 8 & -1 \\ -1 & -1 & -1 \end{bmatrix}.$$

$\Delta W_{ref}$ has the size of the map $W^{ref}$ (either the size of the image I or the size 2S+1 of the search window SW) and, once computed, the image $\Delta W_{ref}$ is multiplied by the scale or sharpening intensity factor $c_{W^{ref}}$, and the result is subtracted to $W^{ref}$.

$c_{W^{ref}}$ is the scale or sharpening intensity parameter which controls the sharpening intensity made on $W^{ref}$.

The way to determine $c_{W^{ref}}$ may be similar to the way $c_{D^{ref}}$ has been determined in step S120, in particular regarding the optional dependency of $c_{W^{ref}}$ on the statistical distribution of weights within the map $W^{ref}$.

For example, the parameter $c_{D^{ref}}$ is set to 1 for strong sharpening, or to 0.2 for a reasonable sharpening.

Following step S140, the step S150 concerns the filtering of the current first pixel $p_{ref}$ using the enhanced weight map $W_{sharp}^{ref}$.

This filtering performs an averaging of the samples of the digital image using the enhanced map of weights, to obtain an enhanced first sample.

As noted above, this averaging consists in spreading similar pixels, i.e. the pixels with large weights, into the current first pixel. Such spreading may be achieved by using the enhanced weight map as a convolution kernel applied to the current first pixel.

As an illustration, the filtered or enhanced pixel $p_{sharp\text{-}ref}$ may be computed as follows:

$$p_{sharp\text{-}ref} = \frac{\sum_{k=0}^{k=2S}\sum_{l=0}^{l=2S} W_{sharp}^{ref}(k, l) \cdot I(x+k-S, y+l-S)}{\sum_{k=0}^{k=2S}\sum_{l=0}^{l=2S} W_{sharp}^{ref}(k, l)}$$

where (x, y) are the coordinates of the current first pixel $p_{ref}$ within image I, and $(k, l) \in [0, 2S]^2$ are the coordinates within the enhanced weight map $W_{sharp}^{ref}$, as appropriate.

The denominator $$\sum_{k=0}^{k=2S}\sum_{l=-}^{l=2S} W_{sharp}^{ref}(k, l)$$

ensures that the weights are normalized such that its integral equals 1 (to keep the same total energy in the image).

In practice, the obtained filtered value $p_{sharp\text{-}ref}$ is saved into a new image $I_{sharp}$ at the location (x, y).

The sharpened or enhanced version $I_{sharp}$ of the original image I is progressively built by repeating the above steps S100-S150 for each pixel $p_{ref}$ of the image I.

Figure 4:
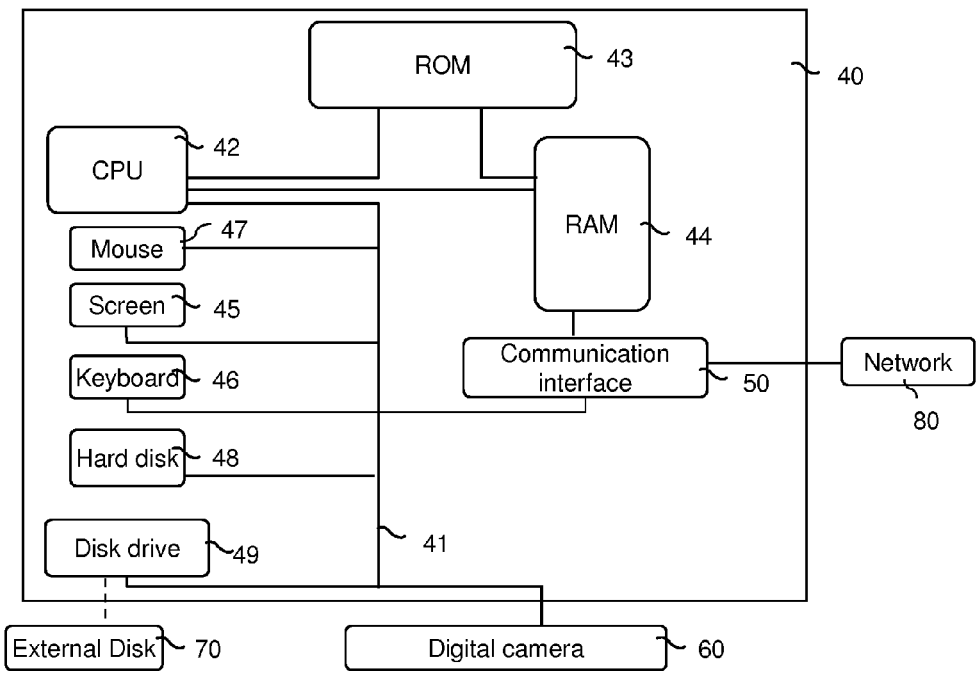
FIG. 4 schematically represents a particular hardware configuration of an information processing device adapted for an implementation of the method according to the embodiments of the invention.

With reference to FIG. 4, a description is now given by way of example of a particular hardware configuration of an information processing device adapted for an implementation of the method according to the invention.

An information processing device implementing the present invention is for example a micro-computer 40, a workstation, a personal assistant, or a mobile telephone connected to different peripherals. According to still another embodiment of the invention, the information processing device takes the form of a camera provided with a communication interface to enable connection to a network.

The peripherals connected to the information processing device comprise for example a digital camera 60, or a scanner or a camcorder or any other means of image acquisition or storage, connected to an input/output graphics card (not shown) and supplying multimedia data to the information processing device.

The peripherals may also comprise a microphone and an input/output card (not shown). The device 40 comprises a communication bus 41 to which there are connected:

- a central processing unit CPU 42 taking for example the form of a microprocessor;
- a read only memory 43 which may contain the programs whose execution enables the implementation of the method according to the invention;
- a random access memory 44, which, after powering up of the device 40, contains the executable code of the programs of the invention as well as registers adapted to record variables and parameters necessary for the implementation of the invention, for example the successive map of distances $D_{sharp}^{ref}$, map of weights $W_{sharp}^{ref}$ and sharpened image $I_{sharp}$;
- a screen 45 for displaying data and/or serving as a graphical interface with the user, who may thus interact with the programs according to the invention, using a keyboard 46 or any other means such as a pointing device, for example a mouse 47 or an optical stylus;
- a hard disk 48 or a storage memory, such as a compact flash type card, able to contain the programs of the invention as well as data used (such as the filters or functions for example) or produced on implementation of the invention;
- an optional disk drive 49, or another reader for a removable data carrier, adapted to receive an external disk 70 and to read/write thereon data processed or to process in accordance with the invention; and
- a communication interface 50 connected to a telecommunications network 80, the interface 50 being adapted to transmit and receive digital data.

The communication bus 41 permits communication and interoperability between the different elements included in the device 40 or connected to it. The representation of the bus 41 is non-limiting and, in particular, the central processing unit 42 unit may communicate instructions to any element of the device 40 directly or by means of another element of the device 40.

The external disks 70 can be any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the information processing device to implement the invention may be stored in read only memory 43, on the hard disk 48 or on a removable digital medium such as an external disk 70 as described earlier. According to a variant, the executable code of the programs is received by the intermediary of the telecommunications network 80, via the interface 50, to be stored in one of the storage means of the device 40 (such as the hard disk 48) before being executed.

The central processing unit 42 controls and directs the execution of the instructions or portions of software code of the program or programs of the invention, the instructions or portions of software code being stored in one of the aforementioned storage means. On powering up of the device 40, the program or programs which are stored in a non-volatile memory, for example the hard disk 48 or the read only memory 43, are transferred into the random-access memory 44, which then contains the executable code of the program or programs of the invention, as well as registers for storing the variables and parameters necessary for implementation of the invention.

It will also be noted that the device implementing the invention or incorporating it may also be implemented in the form of a programmed apparatus. For example, such a device may then contain the code of the computer program(s) in a fixed form in an application specific integrated circuit (ASIC).

The device described here and, particularly, the central processing unit 42, may implement all or part of the processing operations described in relation to FIGS. 1 to 3, to implement the image enhancing method according to the present invention and constitute the corresponding device according to the present invention.

Such device implementing the image enhancing method according to the present invention may be an image acquiring device, such as a still camera, a motion picture camera or a camcorder. The method of the invention then enables embedded processing to enhance the acquired images, in view of storing, transmitting or displaying images or motion pictures with better quality.

The preceding examples are only embodiments of the invention which is not limited thereto.

This application claims priority from UK Patent Application No. 1010177.2 filed Jun. 17, 2010, which is hereby incorporated by reference herein in its entirety.

The invention claimed is:

1. A method of processing a digital image comprising samples, the method comprising the following steps:
   obtaining a spatial window defining, for a given sample, a patch made of the given sample and samples surrounding the given sample;
   determining a plurality of distance values between a first sample and a plurality of other samples to obtain a map of distances, a distance value between two samples representing the similarity between their corresponding patches;
   determining, using the map of distances, a plurality of weights corresponding to the plurality of other samples, so as to obtain a map of weights;
   a step of applying a filter enhancing high spatial frequencies to the map of weights to obtain an enhanced map of weights; and
   filtering the first sample of the digital image by averaging said samples of the digital image using the enhanced map of weights, to obtain an enhanced first sample.

2. The method of claim 1, further comprises a step of applying a filter enhancing high spatial frequencies to the map of distances to obtain an enhanced map of distances which is then used for the computation of the map of weights.

3. The method according to claim 2, wherein the computation of the weights implements a function that is defined in both negative and positive distance values and takes values in a predefined range of weight values.

4. The method according to claim 2, wherein, in the weight computing step, higher weights are computed for negative distance values than for positive distance values.

5. The method of claim 1, wherein the filter enhancing high spatial frequencies is a sharpening filter adapted to increase the contrast in a map.

6. The method of claim 5, wherein the sharpening filtering using the sharpening filter comprises the calculation of the Laplacian operator of said map.

7. The method of claim 5, wherein the sharpening filtering using the sharpening filter depends on the statistical distribution of the distance or weight values within said map.

8. The method of claim 7, wherein the sharpening filter filters said map according to the function $M-c.\Delta M$, where M is the map, $\Delta$ is the Laplacian operator and c is a sharpening intensity parameter which depends on said statistical distribution.

9. The method according to claim 1, further comprising a step of defining a spatial search window centred on the first sample in the digital image, and wherein the plurality of distances for said first sample is computed for each other sample in the spatial window.

10. An image processing device for enhancing a digital image comprising samples, the device comprising:
    obtaining means to obtain a spatial window defining, for a given sample, a patch made of the given sample and samples surrounding the given sample;
    first determination means to compute a plurality of distance values between a first sample and a plurality of other samples, in order to obtain a map of distances, a distance value between two samples representing the similarity between their corresponding patches;
    second determination means to compute, using the map of distances, a plurality of weights corresponding to the plurality of other samples, so as to obtain a map of weights; and
    filtering means to filter the first sample of the digital image by averaging said samples of the digital image using the map of weights to obtain an enhanced first sample;
    wherein the device further comprises a filter enhancing high spatial frequencies in the map of distances or the map of weights and corresponding application means to apply the filter to said map to respectively obtain an enhanced map of distances used as an input by the second computation means to compute the map of weights or an enhanced map of weights used as an input by the filtering means to filter the first sample.

11. The device of claim 10, comprising, stored in a memory, an enhanced map of distances or an enhanced map of weights having negative distance or weight values.

12. The device of claim 11, comprising, stored in a memory an enhanced map of distances and an enhanced map of weights both having negative values.

13. A means of information storage that is readable by a computer system, comprising instructions for a computer program adapted to implement the method according to claim 1 when the program is loaded and executed by the computer system.

14. A computer program product readable by a microprocessor, comprising portions of software code adapted to implement the method according to claim 1 when it is loaded and executed by the microprocessor.

* * * * *